United States Patent
Adachi

(10) Patent No.: US 10,070,047 B2
(45) Date of Patent: Sep. 4, 2018

(54) IMAGE PROCESSING APPARATUS, IMAGE PROCESSING METHOD, AND IMAGE PROCESSING SYSTEM

(71) Applicant: CANON KABUSHIKI KAISHA, Tokyo (JP)

(72) Inventor: Keiji Adachi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/009,317

(22) Filed: Jan. 28, 2016

(65) Prior Publication Data

US 2016/0227106 A1 Aug. 4, 2016

(30) Foreign Application Priority Data

Jan. 30, 2015 (JP) .................... 2015-017259

(51) Int. Cl.
| | |
|---|---|
| H04N 5/222 | (2006.01) |
| H04N 5/232 | (2006.01) |
| G06K 9/00 | (2006.01) |
| H04N 7/18 | (2006.01) |
| G06K 9/32 | (2006.01) |

(52) U.S. Cl.
CPC ..... *H04N 5/23219* (2013.01); *G06K 9/00221* (2013.01); *G06K 9/00369* (2013.01); *G06K 9/32* (2013.01); *H04N 5/23206* (2013.01); *H04N 5/23296* (2013.01); *H04N 7/181* (2013.01)

(58) Field of Classification Search
CPC .................. H04N 5/23219; H04N 5/23222
USPC ....................... 348/240.99, 333.02
See application file for complete search history.

(56) References Cited

U.S. PATENT DOCUMENTS

| | | | | |
|---|---|---|---|---|
| 6,930,718 | B2* | 8/2005 | Parulski | H04N 1/00183 348/333.05 |
| 8,305,464 | B2* | 11/2012 | Suzuki | H04N 5/232 348/231.99 |
| 9,282,239 | B2* | 3/2016 | Kim | H04N 5/23219 |
| 2006/0126894 | A1* | 6/2006 | Mori | H04N 7/142 382/103 |
| 2010/0254571 | A1* | 10/2010 | Matsuura | G06K 9/00281 382/103 |
| 2010/0272363 | A1* | 10/2010 | Steinberg | G06K 9/00228 382/190 |

(Continued)

FOREIGN PATENT DOCUMENTS

| | | |
|---|---|---|
| CN | 1774065 A | 5/2006 |
| CN | 101600051 A | 12/2009 |
| CN | 101631195 A | 1/2010 |

(Continued)

*Primary Examiner* — Anthony J Daniels
(74) *Attorney, Agent, or Firm* — Canon U.S.A., Inc. IP Division

(57) ABSTRACT

An image processing apparatus includes a first detection unit that performs a first type of detection processing on an image, a second detection unit that performs a second type of detection processing for detecting a predetermined object from an area in the image, the area being detected through the first type of detection processing, a determination unit that, in a case where the predetermined object has not been detected by the second detection unit, determines an imaging condition for improving accuracy of the second type of detection processing, and a setting unit that sets the imaging condition determined by the determination unit.

14 Claims, 11 Drawing Sheets

(56) References Cited

U.S. PATENT DOCUMENTS

2012/0133754 A1\* 5/2012 Lee .................. G06F 3/013
  348/78
2014/0184854 A1\* 7/2014 Musatenko ........ H04N 5/23296
  348/240.2

FOREIGN PATENT DOCUMENTS

| CN | 103916592 A | 7/2014 |
|----|-------------|--------|
| JP | 2009-211311 A | 9/2009 |

\* cited by examiner

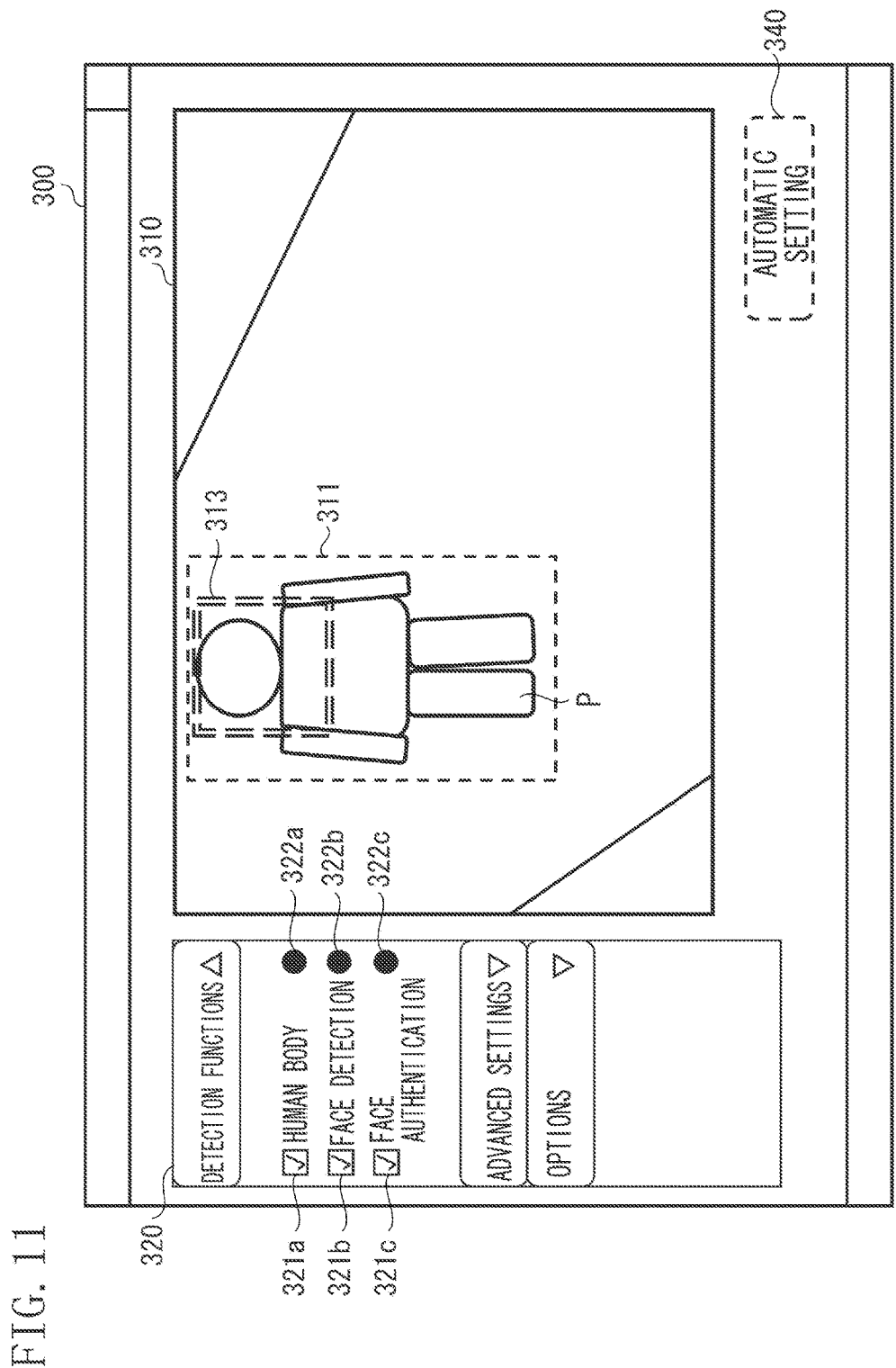

IMAGE PROCESSING APPARATUS, IMAGE PROCESSING METHOD, AND IMAGE PROCESSING SYSTEM

BACKGROUND

Field

Aspects of the present invention generally relate to an image processing apparatus, an image processing method, and an image processing system that perform detection processing for detecting a predetermined object from an image.

Description of the Related Art

In the field of monitoring camera systems, there is a technique for detecting an object matching a predetermined condition from an image by using image analysis technology. In detecting a specific object such as a human body and a face from an image, a collation pattern (dictionary) storing features of the target object is used to detect an object matching the collation pattern from an area to be detected in the image.

Japanese Patent Application Laid-Open No. 2009-211311 discusses such an image processing apparatus. This technique includes reducing image data by a predetermined scaling factor, cropping a pattern to be collated from the reduced image data, and performing analysis processing thereof. In Japanese Patent Application Laid-Open No. 2009-211311, the reduction processing is applied with different scaling factors in succession, followed by the analysis processing. In such a manner, human bodies of various sizes can be detected.

Detection functions such as human body detection and face detection have specifications defining a minimum size and a maximum size at which an object can be detected. A human body or face that appears on an image in a size outside the detectable range is either not able to be detected or, if detected, the detection accuracy is unguaranteed.

Settings of various related parameters, such as a detection function execution on/off settings and a setting of an area to be detected, are made by a user by using a setting tool. A detection result is notified to the user with a superimposition of a human body frame or a face frame on a display screen, or with a display of detection result metadata.

According to the foregoing conventional image processing apparatus, a result is clearly displayed if the analysis processing is performed and an object matching a predetermined condition, such as a human body and a face, is detected. However, no result is displayed if no object is detected. The user is therefore not able to easily check whether the detection functions are properly set and whether the detection functions are functioning properly. More specifically, the user is riot able to find out whether the reason for not detecting an object is that the detection functions are deactivated, or that the settings of the parameters related to the detection processing are not appropriate. As a result, the user is not able to perform an appropriate setting operation or parameter modification operation for obtaining a desired processing result.

SUMMARY

According to an aspect of the present invention, an image processing apparatus includes a first detection unit configured to perform a first type of detection processing on an image, a second detection unit configured to perform a second type of detection processing for detecting a predetermined object from an area in the image, the area being detected through the first type of detection processing, a determination unit configured to, in a case where the predetermined object has not been detected by the second detection unit, determine an imaging condition for improving accuracy of the second type of detection processing, and a setting unit configured to set the imaging condition determined by the determination unit.

Further features of aspects of the present invention will become apparent from the following description of exemplary embodiments with reference to the attached drawings.

BRIEF DESCRIPTION OF THE DRAWINGS

FIG. 11 is a diagram illustrating an example of a display screen after a setting change.

DESCRIPTION OF THE EMBODIMENTS

An exemplary embodiment of the present invention will be described in detail below with reference to the accompanying drawings.

The following exemplary embodiment is lust an example for carrying out aspects of the present invention, and to be corrected or modified as appropriate according to configurations of apparatuses to which aspects of the present invention are applied, and various conditions. Aspects of the present invention are not limited to the following exemplary embodiment.

Figure 1:
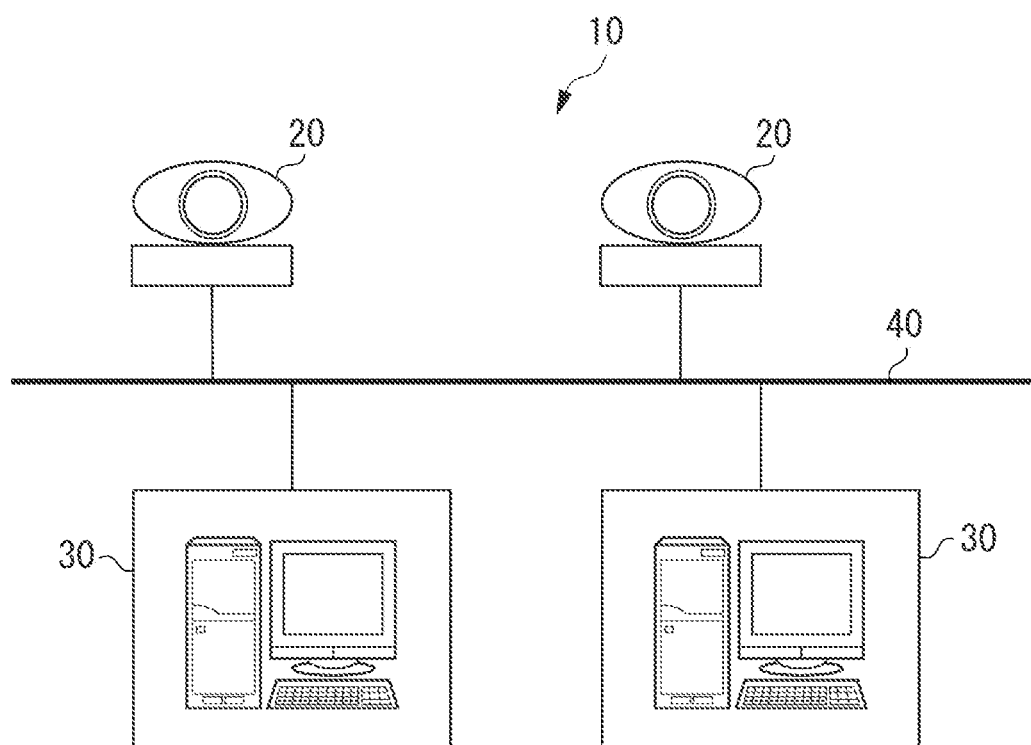
FIG. 1 is a network connection configuration diagram illustrating an example of an image processing system.

FIG. 1 is a network connection configuration diagram illustrating an example of an operating environment of an image processing system according to aspects of the present exemplary embodiment. In the present exemplary embodiment, the image processing system is applied to a network camera system.

A network camera system 10 includes at least one network camera (hereinafter, also referred to simply as "camera") 20 and at least one information processing apparatus 30. The cameras 20 and the information processing apparatuses 30 are connected by a local area network (LAN) 40 (i.e., network line). The network line is not limited to a LAN, and may be the Internet or a wide area network (WAN). The physical connection configuration with the LAN 40 may be wired or wireless. In FIG. 1, two cameras 20 (hereinafter, collectively referred to as a "camera 20") and two information processing apparatuses 30 (hereinafter, collectively referred to as an "information processing apparatus 30") are connected with the LAN 40. The numbers of apparatuses connected with the LAN 40 are not limited to those illustrated in FIG. 1. The camera 20 according to the present exemplary embodiment operates as an image processing apparatus that performs detection processing for detecting a predetermined object from an image.

The camera 20 has an optical zoom function, and captures an image of an object at a predetermined angle of view. The camera 20 has various types of detection functions of detecting a specific object (such as a human face) matching a predetermined condition from a captured image. Examples of the detection functions include a moving object detection function, a human body detection function, and a face detection function.

The camera 20 can perform detection processing based on captured image data by using the foregoing detection functions, and transmits the processing result and the captured image data to the information processing apparatus 30 via the LAN 40. The camera 20 further has a function of changing camera imaging settings, such as a focus, and the camera's angle of view according to communications from outside. The camera 20 may be a fish-eye camera or a multi-eye camera.

The information processing apparatus 30 includes, for example, a personal computer (PC). The information processing apparatus 30 can be operated by users (e.g., observers). The information processing apparatus 30 has display control functions of reproducing image data distributed from the camera 20 and displaying a detection processing result. The information processing apparatus 30 further has a function as an input unit with which various operations are performed such as parameter setting related to the detection processing performed by the camera 20.

Figure 2:
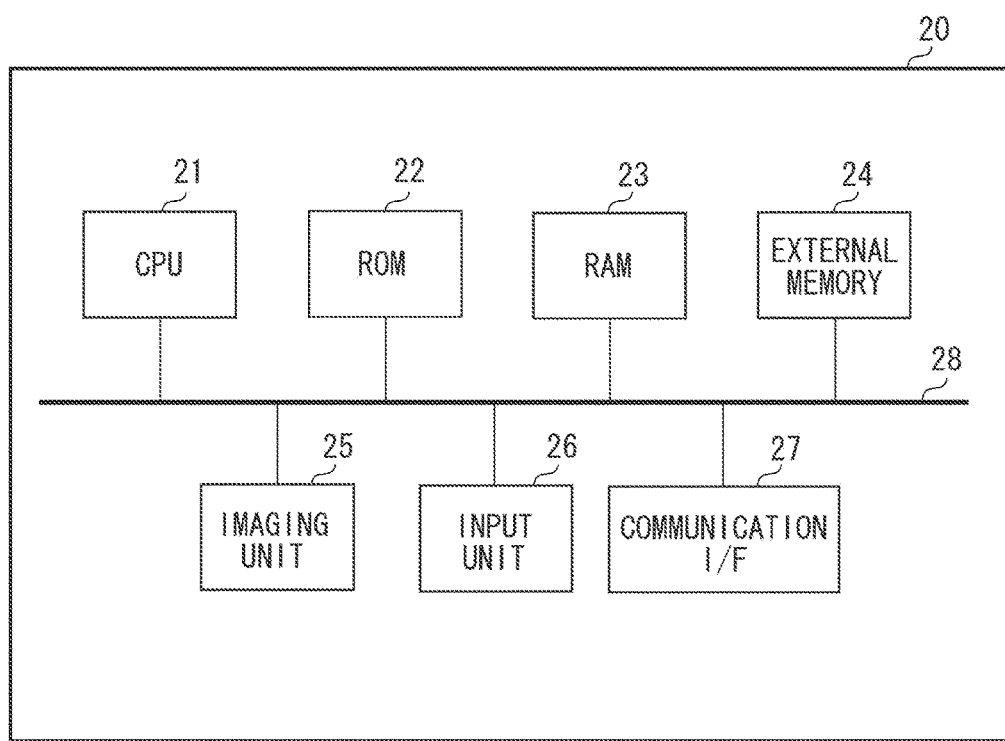
FIG. 2 is a block diagram illustrating an example of a hardware configuration of an imaging apparatus.

FIG. 2 is a block diagram illustrating an example of a hardware configuration of the camera 20.

The camera 20 includes a central processing unit (CPU) 21, a read-only memory (ROM) 22, a random access memory (RAM) 23, an external memory 24, an imaging unit 25, an input unit 26, a communication interface (I/F) 27, and a system bus 28.

The CPU 21 integrally controls an operation of the camera 20. The CPU 21 controls each of the component units (22 to 27) via the system bus 28.

The ROM 22 is a nonvolatile memory that stores a control program required for the CPU 21 to perform processing. The control program may be stored in the external memory 24 or a removable storage medium (not illustrated).

The RAM 23 functions as a main memory and a work area of the CPU 21. More specifically, the CPU 21 loads a necessary program from the ROM 22 into the RAM 23 when performing processing, and executes the program to achieve various functions and operations.

The external memory 24 stores, for example, various types of data and various types of information that are required when the CPU 21 performs processing using a program. The external memory 24 also stores, for example, various types of data and various types of information that are obtained by the CPU 21 performing processing using a program.

The imaging unit 25 captures an image of an object. The imaging unit 25 includes an image sensor such as a complementary metal oxide semiconductor (CMOS) image sensor and a charge coupled device (CCD) image sensor.

The input unit 26 includes a power button. The user of the camera 20 can give instructions to the camera 20 via the input unit 26.

The communication I/F 27 is an interface for communicating with external apparatuses (here, information processing apparatuses 30). For example, the communication I/F 27 is a LAN interface.

The system bus 28 communicably connects the CPU 21, the ROM 22, the RAM 23, the external memory 24, the imaging unit 25, the input unit 26, and the communication I/F 27 with each other.

Functions of the components of the camera 20 are implemented by the CPU 21 executing a program. or programs stored in the ROM 22 or the external memory 24.

The information processing apparatus 30 includes a hardware configuration such as a display unit instead of an imaging unit 25. The display unit includes a monitor such as a liquid crystal display (LCD). As an input unit 26, the information processing apparatus 30 includes a keyboard and a pointing device, such as a mouse, with which the user of the information processing apparatus 30 can give instructions to the information processing apparatus 30.

Figure 3:
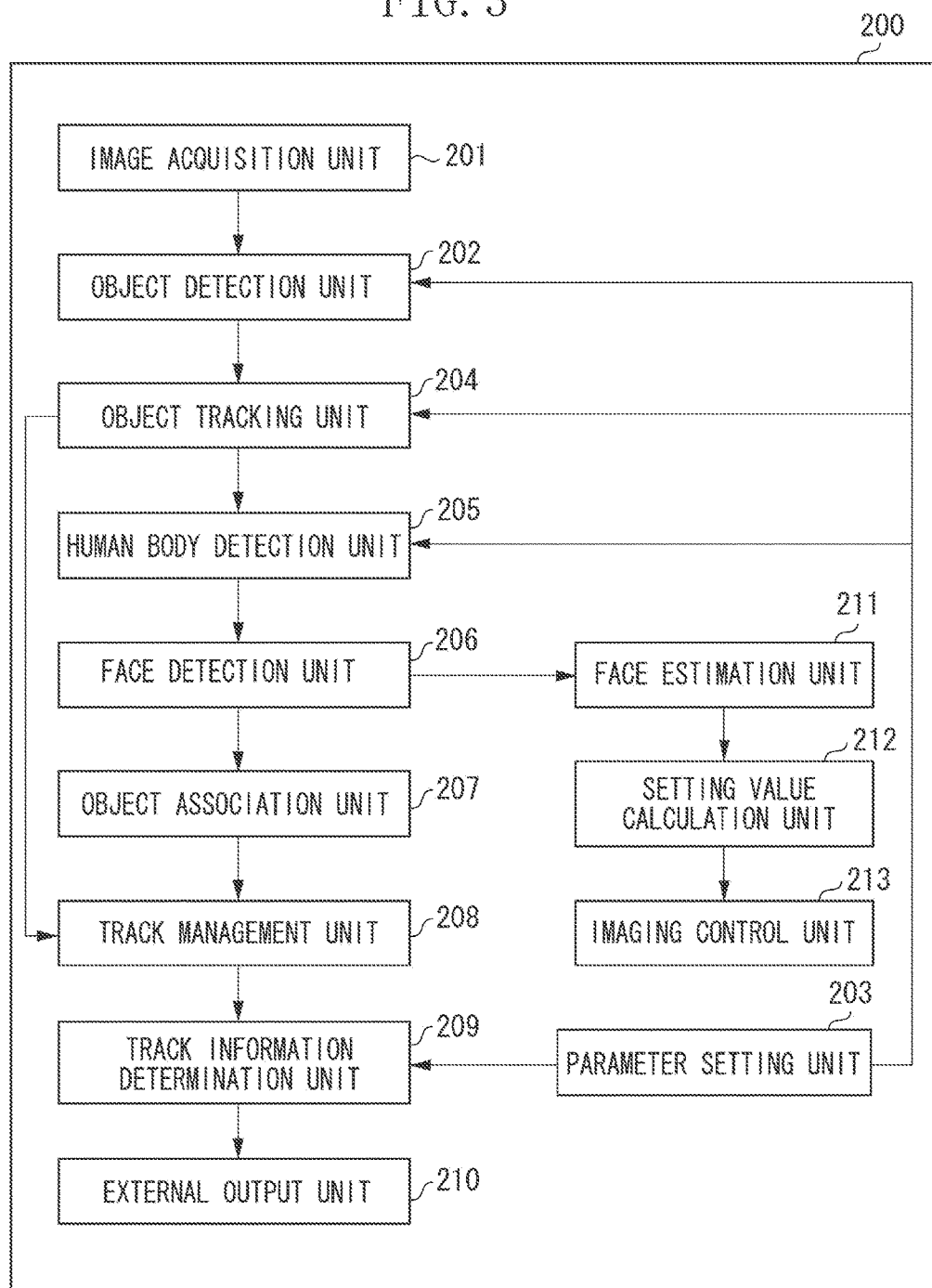
FIG. 3 is a functional block diagram illustrating the imaging apparatus.

FIG. 3 is a block diagram illustrating a functional configuration of an image processing apparatus 200. in the present exemplary embodiment, the camera 20 operates as the image processing apparatus 200, as an example. However, the information processing apparatus 30 may operate as the image processing apparatus 200. A standard PC or other devices may operate as an image processing apparatus 200. The image processing apparatus 200 has a function of displaying a setting screen for changing a detection parameter and the angle of view on a display screen of the information processing apparatus 30, and making various settings related to the detection processing with the user inputting various operations.

While the present exemplary embodiment is applied to an image processing apparatus, the present exemplary embodiment is also applicable to a video processing apparatus because the processing contents are similar to those of the image processing apparatus if a captured video image is processed frame by frame.

The image processing apparatus 200 includes an image acquisition unit 201, an object detection unit 202, a parameter setting unit 203, an object tracking unit 204, a human body detection unit 205, a face detection unit 206, and an object association unit 207. The image processing apparatus 200 further includes a track management unit 208, a track information determination unit 209, an external output unit 210, a face estimation unit 211, a setting value calculation unit 212, and an imaging control unit 213.

The image acquisition unit 201 obtains a moving image or still image captured by an internal imaging sensor (imaging unit 25), and transmits the obtained moving image or still image to the object detection unit 202. The image may be the image supplied from outside.

When the image acquisition unit 201 obtains a moving image, the image acquisition unit 201 successively transmits the images of respective frames constituting the moving image to the object detection unit 202. When the image acquisition unit 201 obtains a still image, the image acquisition unit 201 transmits the still image to the object detection unit 202. The source from which the moving image or still image is supplied is not limited in particular. The source may be a server apparatus or an imaging apparatus that supplies a moving image or still image in a wired or wireless manner. In addition, the image acquisition unit 201 may obtain a moving image or still image from a memory in the image processing apparatus 200 (for example, external memory 24). In the following description, as an example, a single image is transmitted to the object detection unit 202 regardless of whether the image acquisition unit 201 obtains a moving image or a still image. In the former case, the single image corresponds to each frame constituting the moving image. In the latter case, the single image corresponds to the still image.

The object detection unit 202 detects a specific object in the captured image by using a background difference method from the frame image (captured image) obtained from the image acquisition unit 201. Information about the detected object includes an on-screen position of the object, a circumscribed rectangle of the object, and the size of the object. An area (object detection processing area) in which the object detection unit 202 performs such object detection processing is set by the parameter setting unit 203. In the present exemplary embodiment, for simplification of description, the area in which the object detection processing is performed is the entire screen without the setting of a detection range. While the object detection unit 202 performs the processing for detecting an object from an image, the processing method is not limited to any particular method such as the background difference method. Methods for performing similar processing may be applied as appropriate.

If the object detection unit 202 detects, from the image of a frame of interest, the same object as an object detected from the image of the frame of one frame before the frame of interest, the object tracking unit 204 associates the objects in the respective frames with each other. For example, suppose that the object tracking unit 204 assigns an object identifier (ID)=A to an object that is detected by the object detection unit 202 from the image of the frame of one frame before the frame of interest. Then, if the object detection 202 detects this object also from the image of the frame of interest, the object tracking unit 204 assigns the object ID=A also to the object. In such a manner, if the same object is detected across a plurality of frames, the same object ID is assigned to the respective objects. If a new object is detected from the frame of interest, a new object ID is assigned thereto. Similar to the foregoing object detection processing area, an area (object tracking processing area) in which the object tracking unit 204 performs such object tracking operation is set by the parameter setting unit 203.

A method with which the object tracking unit 204 determines an object to be the same across a plurality of frames includes determining an object to be the same if a predicted moving position of the object and a detected position of the object fall within a certain distance by using a movement vector of the detected object. Alternatively, as another method, color, shape, and/or size (area) of an object may be used to associate highly correlated objects between frames. While the object tracking unit 204 performs the processing for determining and tracking the same object across a plurality of frames, the processing method is not limited to any particular method. Methods for performing similar processing may be applied as appropriate.

The human body detection unit 205 detects a human body by performing human body detection processing on an area in which an object has been detected by the object detection unit 202 or on a tracking object area of the object tracking unit 204, using a previously-stored collation pattern dictionary. In the present exemplary embodiment, the human body detection unit 205 is required only to have a function of detecting a human body from an image, and the human body detection processing is not limited to pattern processing. In the present exemplary embodiment, while it is a human body that is to be detected, the object to be detected is not limited to a human body. The object to be detected may be a person's face, an automobile, or an animal. A specific object detection unit that detects a plurality of types of specific objects may be further included. If a plurality of types of objects can be simultaneously detected, a plurality of specific object detection processes may be performed.

The area in which the human body detection unit 205 performs the human body detection processing needs not necessarily be the area in which an object has been detected by the object detection unit 202 or the tracking object area of the object tracking unit 203. For example, the human body detection processing may be performed only on a human body detection processing area set by the parameter setting unit 203. Alternatively, the parameter setting unit 203 may specify maximum and minimum sizes of a human body to be detected, and the human body detection processing may not be performed outside such a range. Part of the human body detection processing or its area can thus be omitted to speed up the human body detection processing.

As described above, the parameter setting unit 203 is a detection processing setting application implemented in the image processing apparatus 200, and sets processing parameters of the object detection unit 202, the object tracking unit 204, and the human body detection unit 205. The processing parameters can be set by using a user interface of the information processing apparatus 30.

The face detection unit 206 performs face detection by performing face detection processing on a human body area detected by the human body detection unit 205. The face detection processing performs, for example, processing for detecting the edges of the eyes and the mouth from a human body area to detect feature portions of a person's face. In other words, the face detection processing detects a face area based on a face position, a face size, and likelihood of a face. The face detection unit 206 may extract feature information to be used for personal authentication from the detected face area, and compare the extracted feature information with previously-stored dictionary data using pattern matching for face authentication. The area in which the face detection processing is performed may be the entire screen. If the object to be detected is other than a human body, the face detection unit 206 may be a feature amount detection unit that detects a feature amount of the object to be detected (for example, in the case of an automobile, a license plate).

Figure 4:
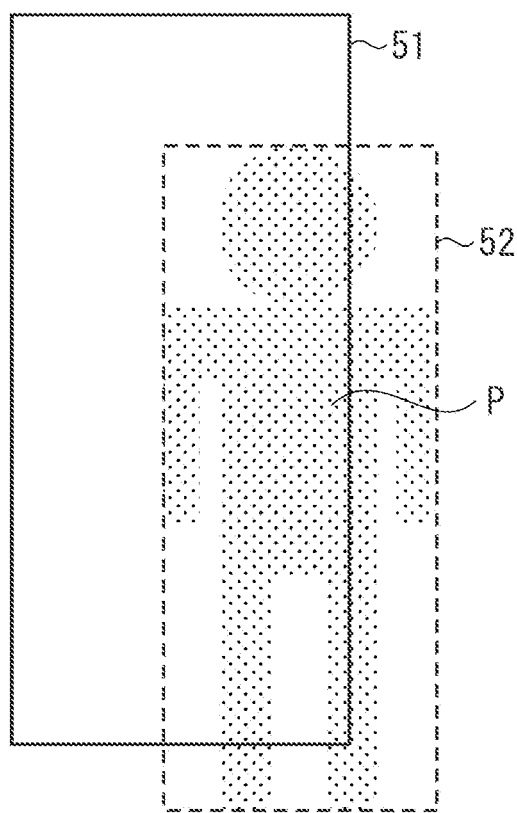
FIG. 4 is a diagram illustrating an example of association between an object and a person.
Figure 5:
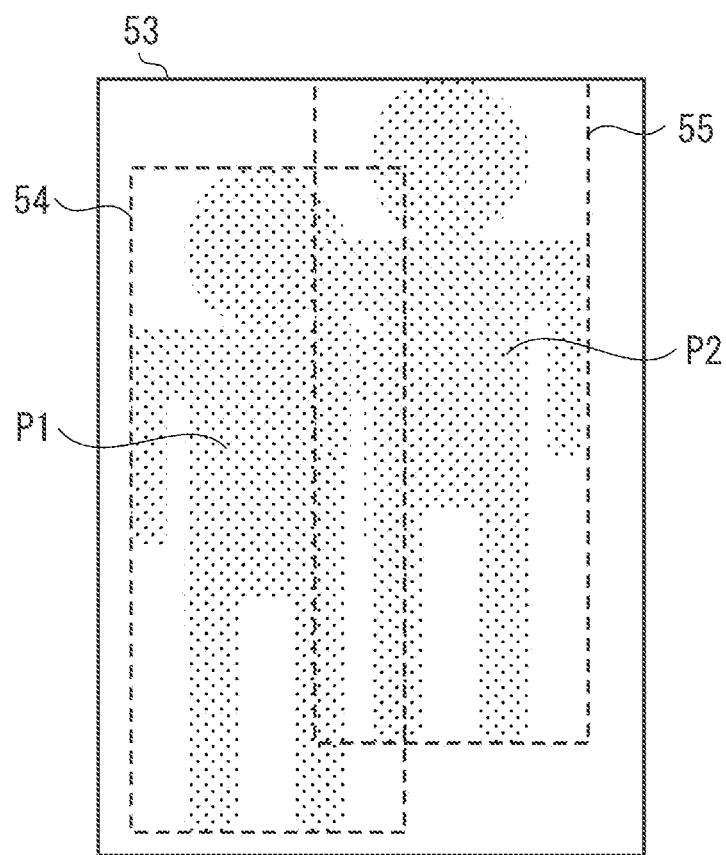
FIG. 5 is a diagram illustrating an example of association between an object and persons.

The object association unit 207 associates an object detected by the object detection unit 202 with a human body detected by the human body detection unit 205. Referring to FIGS. 4 and 5, examples of association between a detected object and a detected human body will be described. FIG. 4 illustrates an example where a circumscribed rectangle 52 of a detected human body P is not included in a circumscribed rectangle 51 of a detected object. In such a case, the object association unit 207 performs association if an overlapping ratio of the circumscribed rectangle 52 of the human body P with respect to the circumscribed rectangle 51 of the object exceeds a preset threshold. The overlapping ratio as employed herein refers to the ratio of the area of the portion where the circumscribed rectangle 51 of the object and the circumscribed rectangle 52 of the human body P overlap to the area of the circumscribed rectangle 52 of the human body P. FIG. 5 illustrates an example where a plurality of human bodies P1 and P2 is detected from a circumscribed rectangle 53 of a detected object. In such a case, the object association unit 207 performs association if the respective overlapping ratios of a circumscribed rectangle 54 of the human body P1 and a circumscribed rectangle 55 of the human body P2 with respect to the circumscribed rectangle 53 of the object exceed the preset threshold.

Figure 6:
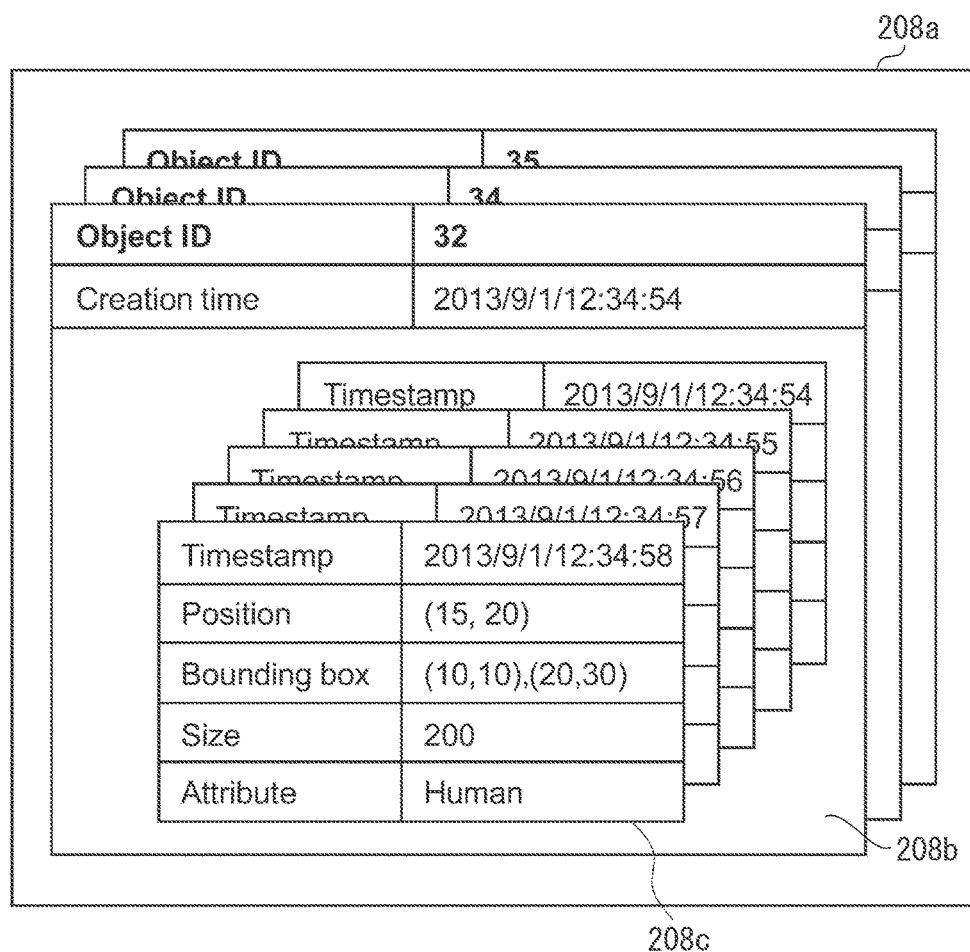
FIG. 6 is a diagram illustrating an example of information managed by a track management unit.

The track management unit 208 manages information about objects obtained from the object detection unit 202 and the object tracking unit 204 as management information object by object. Referring to FIG. 6, an example of the management information managed by the track management unit 208 will be described. Management information 208a manages object information 208b with respect to each object ID. The object information 208b about an object manages information 208c about each frame in which the object is detected. The information 208c includes a time stamp (timestamp) which indicates the date and time of creation of the information 208c, a coordinate position (position) of the detected object, information (bounding box) that defines a circumscribed rectangle including the area of the detected object, a size of the object, and an attribute of the object. The information included in the information 208c is not limited thereto, and any information may be included. The management information 208a managed by the track management unit 208 is used by the track information determination unit 209 (described below).

The track management unit 208 updates the attribute of an object according to the result of association by the object association unit 207. The track management unit 208 may further update the attribute of past objects according to the result of association. Furthermore, the track management unit 208 may set the attribute of subsequent objects according to the result of association. Such processing allows the tracking results of objects having the same object ID to have the same attribute at any time.

The track information determination unit 209 has a function as a passing object detection unit. As processing for determining an object to be detected, the track information determination unit 209 performs passing determination processing according to a determination parameter set by the parameter setting unit 203 and the management information 208a managed by the track management unit 208. According to the present exemplary embodiment, the passing determination processing refers to processing for determining whether an object in an image passes a line for object determination which is set on-screen.

The track information determination unit 209 determines whether a movement vector from a circumscribed rectangle of a human body attribute object in the frame of one frame before the frame of interest to the circumscribed rectangle of the human body attribute object in the frame of interest crosses a line segment (detection line) defined by the parameter setting unit 203. Determining whether the movement vector crosses the defined line segment is equivalent to determining whether the human body attribute object passes the set line segment. The result of determination by the track information determination unit 209 is output to the display unit of the information processing apparatus 30 via the external output unit 210. If the external output unit 210 includes a function of a display unit including a cathode ray tube (CRT) or a liquid crystal screen, the result of determination may be displayed by using the external output unit 210 instead of the display unit of the information processing apparatus 30. While the track information determination processing performed by the track information determination unit 209 is the passing determination processing according to the present exemplary embodiment, the track information determination processing may be any determination processing that uses a determination parameter and track information.

If the face detection unit 206 fails to detect a face, the face estimation unit 211 estimates the size of a face of the target human body from the result of human body detection by the human body detection unit 205. Examples of the method for estimating the size of a face from the result of human body detection include simply estimating the size of a face to be one half of a human body width. If the human body width is 50 pixels, a face width is estimated to be 25 pixels.

For simplification of description, the estimated face width here is estimated at a uniform ratio of ½ to the human body width. However, the ratio does not need to be uniform. For example, the ratio may be changed as appropriate according to the moving direction of the human body and/or the angle at which the human body is captured. For example, with the human body sideways, processing for bringing the ratio closer to 1 allows more appropriate estimation of the face size.

If image analysis processing (face detection processing and/or face authentication processing) fails, the setting value calculation unit 212 estimates (determines) an imaging condition for making the analysis processing successful, and determines an imaging parameter setting value for making the analysis processing successful. In the present exemplary embodiment, if the face detection unit 206 fails to detect a face, the setting value calculation unit 212 determines an imaging parameter setting value (imaging condition) for making the face detection by the face detection unit 206 successful. In the case of the face detection processing, a face is not able to be appropriately detected if the size of the face appearing on-screen does not satisfy a minimum required number of pixels needed for face detection. The setting value calculation unit 212 then determines an imaging parameter setting value such that the face appears in a size enabling face detection, based on the size (number of pixels) of the face estimated by the human body detection unit 205 based on the result of the human body detection, and the foregoing minimum required number of pixels. Here, the imaging parameter setting value is a changing magnification of an optical zoom value of the camera 20.

For example, when the minimum required number of pixels of the face detection unit 206 is 50 pixels in width and height, and the face width estimated by the face estimation unit 211 is 25 pixels, the changing magnification of the optical zoom value for making the face detection of the target human body successful can be calculated to be twice. Since calculating the changing magnification with respect to the minimum face width may result in a failure of face detection, some margin (×1.25) is provided to calculate the changing magnification of the optical zoom value to be 2.5 times by the following equation:

$$(50/25) \times 1.25 = 2.5. \tag{1}$$

In the case of the face detection processing, a face is not able to be appropriately detected if the size of the face appearing on-screen exceeds a maximum number of pixels enabling face detection. If the size (number of pixels) of the face estimated by the face estimation unit 211 exceeds the maximum number of pixels, the setting value calculation unit 212 then calculates an imaging parameter setting value (optical zoom value) such that the face appears in a size enabling face detection. In such a manner, the setting value calculation unit 212 estimates the imaging condition so that the estimated face size falls within a predetermined range needed for face detection.

In the present exemplary embodiment, the changing magnification of the optical zoom value is used as the imaging parameter setting value. However, the imaging parameter setting value may be an imaging resolution (image resolution at which human body detection is performed). For example, if the imaging resolution is to be doubled and an image of 640×480 pixels is used for the human body detection, the setting value calculation unit 212 determines the imaging resolution to be 1280×960 pixels.

In the present exemplary embodiment, the setting unit calculation unit 212 calculates the imaging parameter setting value for making the face detection processing successful. However, the analysis processing is not limited to the face detection processing. For example, the analysis processing may be face authentication processing. If the object to be detected is an automobile, the analysis processing may be license plate detection processing.

The imaging control unit 213 performs zoom control according to the optical zoom value calculated by the setting value calculation unit 212 to change the angle of view of the camera 20. As a result, an image of a face is captured with a resolution enabling face detection. In the present exemplary embodiment, before the imaging control unit 213 applies the imaging parameter setting value calculated by the setting value calculation unit 212 to change the angle of view, the user may be asked for confirmation by using a user interface (UI). In doing so, the imaging control unit 213 may present a message indicating that the analysis processing has failed, a reason for the failure of the analysis processing, and an imaging condition (recommended setting) for making the analysis processing successful. This configuration can significantly improves operability.

Figure 7:
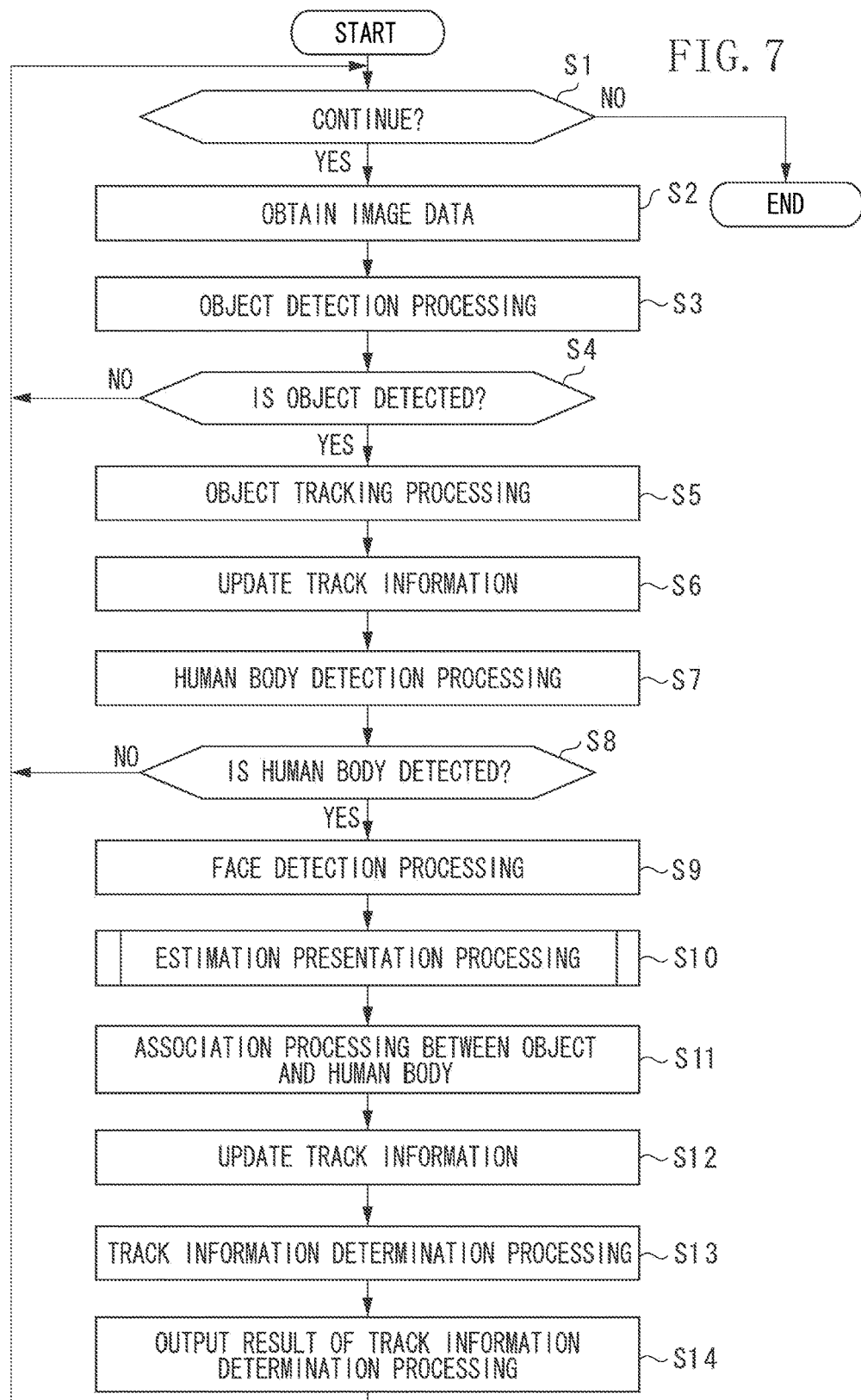
FIG. 7 is a flowchart illustrating an operation of an image processing apparatus.

Next, an operation of the image processing apparatus 200 will be described with reference to FIG. 7. Processing of FIG. 7 is implemented by the CPU 21 of the camera 20 reading and executing a necessary program or programs. Part or all of the processing of FIG. 7 may be implemented by dedicated hardware. The processing of FIG. 7 is started in response to input of a user instruction for starting detection processing. The start timing of the processing of FIG. 7 is not limited to the foregoing timing.

In step S1, the image processing apparatus 200 determines whether to continue image processing. For example, the image processing apparatus 200 determines whether to continue the image processing, according to whether an instruction to end the image processing is accepted from the user. If the image processing apparatus 200 determines to end the image processing (NO in step S1), the processing ends. On the other hand, if the image processing apparatus 200 determines to continue the image processing (YES in step S1), the processing proceeds to step S2.

In step S2, the image acquisition unit 201 obtains image data. The processing proceeds to step S3. In step S3, the object detection unit 202 performs the object detection processing on the image data obtained in step S2. In step S4, the object detection unit 202 determines whether an object has been detected through the object detection processing of step S3. If it is determined that an object has not been detected (NO in step S4), the processing returns to step S1. If it is determined that an object has been detected (YES in step S4), the processing proceeds to step S5.

In step S5, the object tracking unit 204 performs object tracking processing. In step S6, the track management unit 208 updates track information according to a result of the object tracking processing in step S5. In step S7, the human body detection unit 205 performs the human body detection processing on an area where the object is detected through the object detection processing of step S3 in a human body detection processing area set by the parameter setting unit 203. In step S8, the human body detection unit 205 determines whether a human body is detected through the human body detection processing of step S7. If it is determined that a human body has not been detected (NO in step S8), the processing returns to step S1. If it is determined that a human body has been detected (YES in step S8), the processing proceeds to step S9.

In step S9, the face detection unit 206 performs the face detection processing on a human body area detected by the human body detection unit 205. In step S10, the image processing apparatus 200 performs estimation presentation processing by using a result of the human body detection processing in step S7 and a result of the face detection processing in step S9. The estimation presentation processing is processing for estimating and presenting the imaging parameter setting value required for face detection if the face detection processing of step S9 fails to detect a face. Details of the estimation presentation processing will be described below.

In step S11, the object association unit 207 performs association processing for associating an object with a human body. In step S12, the track management unit 208 updates the track information based on a result of the association processing in step S11. In step S13, the track information determination unit 209 performs the track information determination processing to determine whether the object has passed a detection line. In step S14, the external output unit 210 outputs a result of the track information determination processing to outside. The processing returns to step S1.

Next, the estimation presentation processing performed in step S10 will be described.

Figure 8:
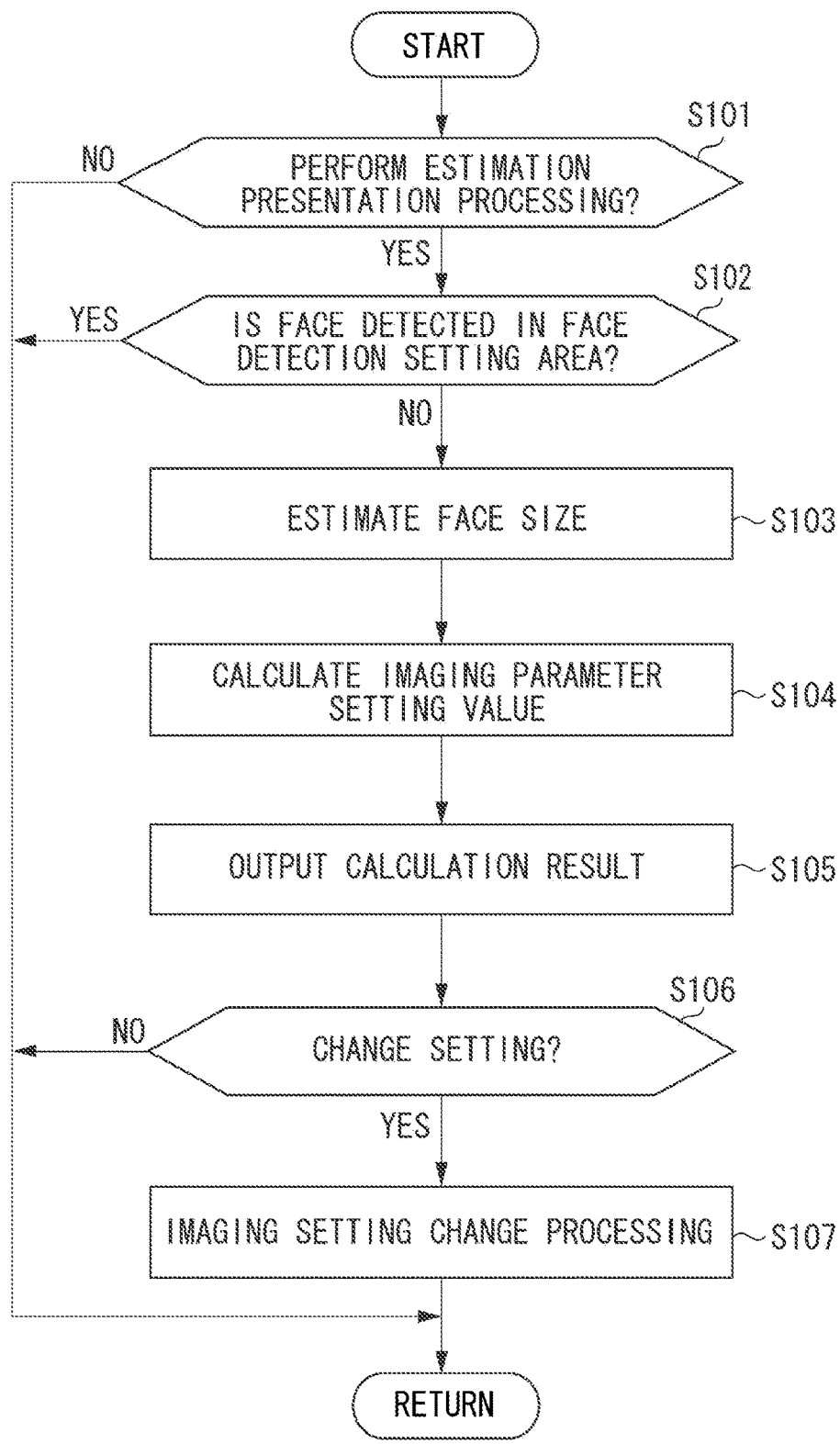
FIG. 8 is a flowchart illustrating estimation presentation processing.

As illustrated in FIG. 8, in step S101, the image processing apparatus 200 determines whether to perform the estimation presentation processing. For example, the image processing apparatus 200 determines whether to continue the estimation presentation processing, according to whether an instruction to end the estimation presentation processing is accepted from the user. If the image processing apparatus 200 determines to end the estimation presentation processing (NO in step S101), the processing end. The processing then proceeds to step S11 of FIG. 7. On the other hand, if the image processing apparatus 200 determines to continue the estimation presentation processing (YES in step S101), the processing proceeds to step S102.

In step S102, the image processing apparatus 200 determines, used on the result of the face detection processing in the foregoing step S9, whether a face within a predetermined range has been detected within a face detection setting area set by the parameter setting unit 203. If it is determined that a face has been detected (YES in step S102), the processing simply ends. If it is determined that a face has not been detected (NO in step S102), the processing proceeds to step S103. The face detection setting area refers to an area corresponding to the human body area detected by the human body detection unit 205. The face detection setting area may be the same area as the human body area, or may be an area around and wider than the human body area.

In step S103, the face estimation unit 211 estimates the face size of the target human body based on the result of the human body detection processing in the foregoing step S7. In step S104, the setting value calculation unit 212 calculates the imaging parameter setting value at which a face appears in a size enabling face detection, based on the face size estimated in step S103.

In step S105, the setting value calculation unit 212 outputs the calculation result of step S104 to the information processing apparatus 30, and presents the calculation result on the display unit of the information processing apparatus 30. The setting value calculation unit 212 also displays a screen for accepting a setting change instruction.

Figure 9:
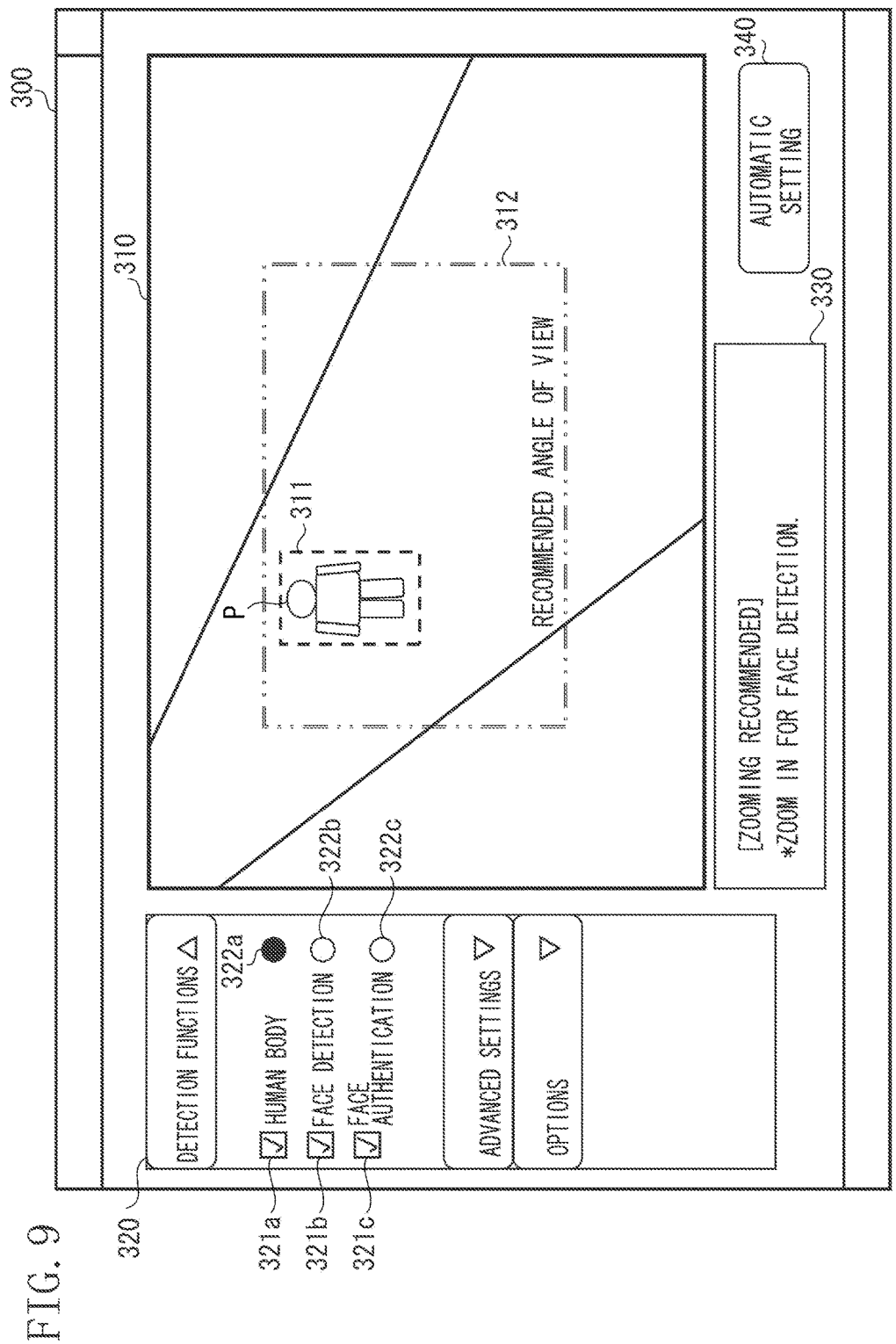
FIG. 9 is a diagram illustrating an example of an information presentation screen before a setting change.

FIG. 9 illustrates an example of an information presentation screen before a setting change. A setting screen window 300 illustrated in FIG. 9 is a UI screen for making changes in imaging controls, such as changing the parameters of various detection functions and the angle of view of the image processing apparatus 200. The setting screen window 300 includes a video display section 310 in which a captured video image is displayed, and a setting section 320 which is a UI for setting the various detection functions performed by the image processing apparatus 200. The setting screen window 300 also includes an information display section 330 for displaying recommendation information and a setting change instruction section (automatic setting button) 340 from which the user inputs a setting change instruction.

In the example illustrated in FIG. 9, the video display section 310 displays a captured video image of a road stretching from the upper left of the screen to the lower right of the screen. A human body P is captured in a central portion of the screen. The setting section 320 includes check boxes 321a to 321c from which the various detection functions can be switched between activated and deactivated states. FIG. 9 illustrates an example where the human body detection function, the face detection function, and a face authentication function are activated.

The setting section 320 further includes success/failure lamps 322a to 322c which can display whether the detection results of the respective activated functions are successful or failed. FIG. 9 illustrates an example where the human body detection is successful, and the face detection and the face authentication are failed.

The success or failure of the detection result of each function can be also checked from the video display section 310. If the human body detection is successful, the video display section 310 displays the result as a human body frame 311 surrounding a detected human body P as illustrated in FIG. 9. If the face detection is successful, the video display section 310 displays a face frame surrounding the detected face. Furthermore, if the face authentication is successful, the face authentication result (such as a registered name) is displayed near the face frame displayed in the video display section 310. The display methods of the detection results of the respective functions are not limited to the foregoing descriptions.

As in the example illustrated in FIG. 9, the face detection and the face authentication can fait despite successful human body detection. There are two main reasons for such failures. The first is that the pixels (resolution) are not enough for the processing. In general, minimum resolution required for various detection functions is defined as specifications for each of the detection functions. If a processing target falls below the minimum resolution, the detection processing becomes not available or drops in detection accuracy. The second reason is simply that no face is captured in the image.

If the face detection and the face authentication fail despite successful human body detection, the setting value calculation unit 212 determines that the resolution is not enough for the face detection or the face authentication. Then, as illustrated in FIG. 9, the information display section 330 displays recommendation information for recommending zooming. The video display section 310 further displays a recommended angle of view 312. In such a manner, the image processing apparatus 200 determines the imaging condition for making the face detection and the face authentication successful, and displays the information about the determined imaging condition on-screen.

Figure 10:
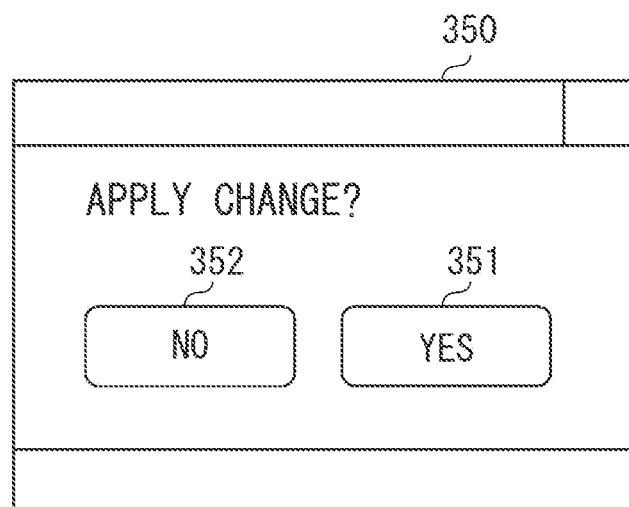
FIG. 10 is a diagram illustrating an example of a confirmation dialog.

If the user presses the automatic setting button 340 here, the information processing apparatus 30 displays a confirmation dialog 350 illustrated in FIG. 10 on the display unit. If the user then selects a "yes" button 351 illustrated in FIG. 10, the information processing unit 30 transmits the user's setting change instruction to the image processing apparatus 200. On the other hand, if the user selects a "no" button 352 illustrated in FIG. 10, the setting change (change in the angle of view) is cancelled, and the information processing apparatus 30 restores the screen display to the state of the setting screen window 300 of FIG. 9. In such a manner, according to the user input after the display of error information indicating a failure of the face detection and the face authentication, the information processing apparatus 30 of the present exemplary embodiment sets the imaging condition required to make the face detection and the face authentication successful. However, it is not limited to the foregoing configuration. The imaging condition required to make the face detection and the face authentication successful may be configured to be automatically set if the face detection and the face authentication fail.

Referring back to FIG. 8, in step S106, if the setting value calculation unit 212 receives the setting change instruction (YES in step S106), the processing proceeds to step S107. On the other hand, if the setting value calculation unit 212 does not receive a setting change instruction (NO in step S106), the setting value calculation unit 212 determines not to make a setting change, and the processing simply ends.

In step S107, the imaging control unit 213 performs imaging setting change processing based on the imaging parameter setting value calculated in step S104. More specifically, the imaging control unit 213 changes the optical zoom value to change the angle of view.

After the completion of the change of the angle of view, the image processing unit 200 switches the display of the display unit of the information processing apparatus 30 as illustrated in FIG. 11. At this time, the video display section 310 displays a video image captured at the recommended angle of view 312 illustrated in FIG. 9. Furthermore, the image processing apparatus 200 performs the detection processes at the changed angle of view. If the face detection processing succeeds at the changed angle of view, a face frame 313 is displayed as illustrated in FIG. 11. At this time, a registered name can be also displayed near (for example, on the right of) the face frame 313 as a result of the face authentication processing.

The face detection may sometimes fail even if the detection processes are performed again after the change of the angle of view because of the foregoing second reason. Namely, no face is being captured simply because, for example, the target human body is facing backwards. In such a case, the estimation presentation processing of FIG. 8 may be controlled to pause for a certain period of time. The estimation presentation processing may be resumed if the human body takes a moving direction such that the face appears.

If there are many human bodies on-screen, the user may be allowed to specify a human body or bodies to detect, or an average estimated face size of the respective human bodies within a detection target area may be calculated.

As described above, according to the present exemplary embodiment, if a specific object matching a predetermined condition in an image is subjected to analysis processing and the analysis processing fails, the failure information is displayed. In a specific example, as illustrated in FIG. 9, the detection function (s) activated by the user and the success/failure result(s) thereof may be clearly displayed with the checkboxes 321a to 321c and the success/failure lamps 322a to 322c. This allows the user to visually check whether a desired detection function is properly set and whether a desired detection function is functioning properly. In other words, the user can easily find out whether the reason of a failure of desired analysis processing is the deactivation of a desired detection function or an inappropriate setting of a processing parameter. The user can thus perform an appropriate setting operation and/or parameter modification operation for performing the desired analysis processing.

At this time, the image processing apparatus 200 estimates an imaging condition required to make the analysis processing successful, and presents the information about the imaging condition. Consequently, the user can easily check the reason why the desired analysis processing fails to be performed, and find out what change can be made to the settings to perform the desired analysis processing.

If the image processing apparatus 200 detects an object from an image and detects a specific object from the detected object, the image processing apparatus 200 estimates an imaging condition for making the detection of the specific object successful based on the result of the object detection. If the detection of the specific object fails due to an improper setting of an imaging parameter, the image processing apparatus 200 can appropriately estimate the imaging parameter (imaging condition). At this time, the image processing apparatus 200 presents the estimated imaging condition as a recommended imaging setting. In a specific example, as illustrated in FIG. 9, the information display section 330 displays a message that zooming enables face detection and face authentication, and the video display section 310 displays the recommended angle of view 312. The user can thus easily find out what change can be made to the imaging settings to make the detection of the specific object successful.

To detect a person's face as the specific object, the image processing apparatus 200 initially detects a person from an image and detects the person's face from the detected person. Based on the size of the detected person, the image processing apparatus 200 estimates the size of the person's face. If the estimated face size does not fall within a predetermined range required for the face detection processing (for example, falls below the minimum required number of pixels), the image processing apparatus 200 determines the reason for a failure of the face detection processing to be an improper setting of the imaging parameter. In such a manner, the reason for a failure of desired analysis processing can be accurately determined.

In such a case, the image processing apparatus 200 estimates the imaging condition for bringing the estimated face size into the foregoing predetermined range. For example, the image processing apparatus 200 calculates an imaging parameter setting value so that the face is captured with the foregoing minimum required number of pixels or more. In such a manner, the image processing apparatus 200 can appropriately estimate the imaging condition for making the desired analysis processing successful.

Furthermore, at this time, the image processing apparatus 200 calculates the optical zoom value of the camera 20 as the imaging parameter setting value. The imaging condition for making the desired analysis processing successful can thus be easily achieved.

Calculating the imaging parameter setting value for making the desired analysis processing successful as described above, the image processing apparatus 200 applies the calculated imaging parameter setting value to the camera 20 and automatically changes the imaging condition. Consequently, the setting change can be easily performed. When changing the imaging condton, the image processing apparatus 200 obtains a confirmation from the operator in advance by using a user interface. This configuration can improve operability.

(Modifications)

In the foregoing exemplary embodiment, as an example, the imaging parameter setting value is the optical zoom value, and the information for recommending zooming is presented as the recommendation information. However, other information may be applied. For example, if it is determined that desired analysis processing fails due to high object moving speed, the imaging parameter setting value may be a frame rate, and the recommendation information may be information for recommending an increase in the frame rate. This configuration allows tracking of an object even if the object moving speed is relatively high. Moreover, if the target object is an automobile, a license plate can be authenticated with such a configuration For example, if it is determined that desired analysis processing fails due to insufficient brightness, the imaging parameter setting value may be an on/off setting value of a high dynamic range (HDR) function, and the recommendation information may be information for recommending brighter lighting. As a result, even if the brightness is insufficient, the HDR function can be turned on to enable the desired analysis processing. Furthermore, what to use as the imaging parameter setting value may be determined according to the detection function(s) activated by the user. For example, if the detection function activated by the user is the face authentication or license plate detection, the imaging parameter setting value may be a zoom value. If the detection function activated by the user is the passing detection of an object, the imaging parameter setting value may be the frame rate.

In the foregoing exemplary embodiment, as an example, the video image obtained by the image acquisition unit 201 is displayed on the setting screen window 300 frame by frame to perform the series of estimation presentation processes. However, this is not limited thereto. For example, the foregoing processing may be performed on video images and still images captured in the past, and still images stored in other storage media.

Since a human body to be captured moves, the captured size of the human body varies accordingly. To that end, the estimation presentation processing may be performed frame by frame, or in units of some frames by using an average human body size. Alternatively, the setting screen window 300 may include a UI for stopping updating the video image displayed on the video display section 310 so that a still image can be displayed and operated on the video display section 310.

In the foregoing exemplary embodiment, as an example, the camera with which the image acquisition unit 201 obtains an image and the camera of which the imaging control unit 213 changes the angle of view are the same. However, the cameras may be respective different ones.

In the foregoing exemplary embodiment, the human body detection processing and the face detection processing are performed by the same image processing apparatus 200, whereas such processing may be performed by different image processing apparatuses. Moreover, the various types of detection processing and the setting value calculation processing are performed by the same image processing apparatus 200, whereas such processing may be performed by different image processing apparatuses. For example, the settings of the detection functions and the setting of the angle of view may be shared between a plurality of cameras. Then, results of the various types of detection processing obtained from respective different cameras may be input to yet another image processing apparatus 200 to calculate a setting value, and the setting value may be applied to other cameras.

The analysis processing according to the foregoing exemplary embodiment may be detection processing for detecting a predetermined object. In other words, the camera 20 can perform, for example, a second type of detection processing for detecting a face on an area where a human body is detected by performing a first type of detection processing for detecting a human body. If a human body is detected by the first type of detection processing but a face is not detected by the second type of detection processing, the camera 20 determines that the second type of detection processing is failed. The camera 20 then can determine an imaging condition required to make the second type of detection processing successful, and set the imaging condition into the camera 20. The first type of detection processing is not limited to the detection of a human body, and may detect a moving object, an automobile, or animals other than human beings. The second type of detection processing is not limited to the detection processing of a face, and may be detection processing of a characteristic area such as a license plate.

According to the configuration of the present exemplary embodiment, information for performing appropriate image analysis processing can be presented to the user.

(Other Embodiments)

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more the above-described embodiment(s) and/or controlling the one or more circuits to perform the functions of one or more of the above-described embodiment (s) The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While aspects of the present invention have been described with reference to exemplary embodiments, it is to he understood that the aspects of the invention are not limited to the disclosed exemplary embodiments. The scope of the following claims is to be accorded the broadest interpretation so as to encompass all such modifications and equivalent structures and functions.

This application claims the benefit of Japanese Patent Application No. 2015-017259, filed Jan. 30, 2015, which is hereby incorporated by reference herein in its entirety.

What is claimed is:

1. An image processing apparatus comprising:
a hardware processor; and
a memory which stores instructions to be executed by the hardware processor wherein in accordance with the instructions executed by the hardware processor, the image processing apparatus functions to perform steps, wherein the steps comprise:
receiving an instruction for validating first detection processing and second detection processing from a plurality of detection functions, wherein the second detection processing is different from the first detection processing;
performing the first detection processing to detect an object from an image captured by an imaging apparatus; and
outputting a recommendation of a zoom for the second detection processing to a display unit based on the object detected in the first detection processing and a failure of the second detection processing, wherein the second detection processing is for detecting a specific feature in the object detected in the first detection processing.

2. The image processing apparatus according to claim 1, wherein the image processing apparatus further functions to perform steps of:
causing, in a case where the specific feature of the object has not been detected by the second detection processing performed after the first detection processing, the display unit to display error information;
accepting an instruction by a user after the error information is displayed by the display unit; and
setting a condition of zoom in response to the accepted instruction.

3. The image processing apparatus according to claim 2, wherein the display unit displays a rectangle indicating a recommended angle of view as the recommendation.

4. The image processing apparatus according to claim 1, wherein the object detected by the first detection processing is a person, and
wherein the specific feature detected by the second detection processing is a face.

5. The image processing apparatus according to claim 1, wherein the condition is a zoom magnification of the imaging apparatus.

6. The image processing according to claim 1, wherein the image processing apparatus further functions to perform a step of:
setting the condition of zoom to the imaging apparatus.

7. The image processing according to claim 1, wherein display unit displays an image captured according to the condition by the imaging apparatus.

8. The image processing apparatus according to claim 1, wherein the first detection processing detects both a size of the object and a position of the object.

9. An image processing method comprising:
receiving an instruction for validating first detection processing and second detection processing from a plurality of detection functions, wherein the second detection processing is different from the first detection processing;
performing the first detection processing to detect an object from an image captured by an imaging apparatus; and outputting a recommendation of an zoom for the second detection processing to a display unit based on the object detected in the first detection processing and a failure of the second detection processing, wherein the second detection processing is for detecting a specific feature in the object detected in the first detection processing.

10. The image processing method according to claim 9, further comprising:

causing, in a case where the specific feature has not been detected by the second detection processing performed after the first detection processing, the display unit to display error information;

accepting an instruction by a user after the error information is displayed by the display unit; and setting a condition of the zoom in response to the accepted instruction.

11. The image processing method according to claim 10, wherein the display unit displays an image indicating a recommended angle of view as the imaging condition, and wherein in the setting, the determined imaging condition is set in response to the instruction accepted after the error information and the image indicating the determined imaging condition are displayed by the display unit.

12. A non-transitory computer-readable storage medium storing computer executable instructions for causing a computer to execute a method comprising:

receiving an instruction for validating first detection processing and second detection processing from a plurality of detection functions, wherein the second detection processing is different from the first detection processing;

performing the first detection processing to detect an object from an image captured by an imaging apparatus; and outputting a recommendation of a zoom for the second detection processing to a display unit based on the object detected in the first detection processing and a failure of the second detection processing, wherein the second detection processing is for detecting a specific feature in the object detected in the first detection processing.

13. The non-transitory computer-readable storage medium according to claim 12, the method further comprising:

causing, in a case where the specific feature of the object has not been detected by the second detection processing performed after the first detection processing, the display unit to display error information;

accepting an instruction by a user after the error information is displayed by the display unit; and setting a condition of the zoom in response to the accepted instruction.

14. The non-transitory computer-readable storage medium according to claim 13, wherein the display unit displays an image indicating a recommended angle of view as the recommendation.

* * * * *